US006701752B2

(12) United States Patent
Abe et al.

(10) Patent No.: US 6,701,752 B2
(45) Date of Patent: Mar. 9, 2004

(54) SYNTHESIZED SILICA GLASS OPTICAL MEMBER AND METHOD FOR MANUFACTURING THE SAME

(75) Inventors: Jun Abe, Gunma (JP); Nobuyasu Mantoku, Gunma (JP); Shinji Makikawa, Gunma (JP); Seiki Ejima, Kagawa (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 349 days.

(21) Appl. No.: 09/797,857

(22) Filed: Mar. 5, 2001

(65) Prior Publication Data

US 2001/0018835 A1 Sep. 6, 2001

(30) Foreign Application Priority Data

Mar. 3, 2000 (JP) ........................................ 2000-058810

(51) Int. Cl.[7] ............................................. C03B 37/018
(52) U.S. Cl. .............................. 65/397; 65/111; 65/414; 65/424; 65/426
(58) Field of Search ........................... 65/111, 397, 413, 65/424, 414, 426, 427

(56) References Cited

U.S. PATENT DOCUMENTS 4,979,971 A * 12/1990 Kyoto et al. .................. 65/398
5,679,125 A * 10/1997 Hiraiwa et al. ............... 65/397
5,713,979 A    2/1998 Nicholson et al.
5,735,921 A *  4/1998 Araujo et al. ................ 65/32.1
5,799,123 A *  8/1998 Oyobe et al. ................ 385/124

FOREIGN PATENT DOCUMENTS

| EP | 0691312 A1 |   | 1/1996 |
|---|---|---|---|
| JP | 62-143835 | * | 6/1987 |
| JP | 8-67530 |   | 3/1996 |
| JP | 8-75901 |   | 3/1996 |
| JP | 10-67521 |   | 3/1998 |
| JP | 11-240728 |   | 3/1999 |

OTHER PUBLICATIONS

Abstract of JP 62–143835, Jun. 1987.*

* cited by examiner

Primary Examiner—Sean Vincent
(74) Attorney, Agent, or Firm—Pillsbury Winthrop LLP (57) ABSTRACT

A method for manufacturing a synthesized silica glass optical member, the method comprising: providing a porous silica glass body; heating the porous silica glass body in an atmosphere containing hydrogen or oxygen, and sintering the porous silica glass body in an atmosphere containing fluorine compound. Furthermore, a synthesized silica glass optical member manufactured by the method.

8 Claims, 6 Drawing Sheets

| | | CONDITIONS | | REMARKS |
|---|---|---|---|---|
| | | FIRST PROCESS | SECOND PROCESS | |
| EXAMPLE 1 | ATMOSPHERE<br>TEMPERATURE<br>PASSING SPEED | He 3 ℓ/min, H₂ 0.5 ℓ/min<br>1000°C<br>3mm/min | SiF₄ 1.6 ℓ/min<br>1380°C<br>3mm/min | PRE-HEATING PROCESS WITH H₂ |
| COMPARATIVE EXAMPLE 1 | ATMOSPHERE<br>TEMPERATURE<br>PASSING SPEED | NONE | SiF₄ 1.6 ℓ/min<br>1380°C<br>3mm/min | NO PRE-HEATING |
| COMPARATIVE EXAMPLE 2 | ATMOSPHERE<br>TEMPERATURE<br>PASSING SPEED | NONE | SiF₄ 1.6 ℓ/min, H₂ 0.5 ℓ/min<br>1380°C<br>3mm/min | NO PRE-HEATING; SINTERING WITH H₂ |
| COMPARATIVE EXAMPLE 3 | ATMOSPHERE<br>TEMPERATURE<br>PASSING SPEED | He 3 ℓ/min, Cl₂ 0.3 ℓ/min<br>1000°C<br>3mm/min | SiF₄ 1.6 ℓ/min, H₂ 0.5 ℓ/min<br>1380°C<br>3mm/min | DEHYDRATION WITH Cl₂; SINTERING WITH H₂ |

FIG. 5

| | | CONDITIONS | | REMARKS |
|---|---|---|---|---|
| | | FIRST PROCESS | SECOND PROCESS | |
| EXAMPLE 2 | ATMOSPHERE TEMPERATURE PASSING SPEED | He 3ℓ/min, O₂ 1ℓ/min 1000°C 3mm/min | SiF₄ 1.6ℓ/min 1380°C 3mm/min | PRE-HEATING PROCESS WITH O₂ |
| COMPARATIVE EXAMPLE 4 | ATMOSPHERE TEMPERATURE PASSING SPEED | NONE | SiF₄ 1.6ℓ/min 1380°C 3mm/min | NO PRE-HEATING |
| COMPARATIVE EXAMPLE 5 | ATMOSPHERE TEMPERATURE PASSING SPEED | NONE | SiF₄ 1.6ℓ/min, O₂ 1ℓ/min 1380°C 3mm/min | NO PRE-HEATING; SINTERING WITH O₂ |
| COMPARATIVE EXAMPLE 6 | ATMOSPHERE TEMPERATURE PASSING SPEED | He 3ℓ/min, Cl₂ 0.3ℓ/min 1000°C 3mm/min | SiF₄ 1.6ℓ/min, O₂ 1ℓ/min 1380°C 3mm/min | DEHYDRATION WITH Cl₂; SINTERING WITH O₂ |

FIG. 6

SYNTHESIZED SILICA GLASS OPTICAL MEMBER AND METHOD FOR MANUFACTURING THE SAME

This patent application claims priority based on a Japanese patent application No. 2000-58810 filed on Mar. 3, 2000, the contents of which are incorporated herein by reference.

BACKGROUND OF THE INVENTION

1. Field of the Invention

The present invention relates to an optical member to be used in an apparatus using a light source of an ultraviolet laser having a wavelength of 400 nm or less, especially $F_2$ excimer laser. The present invention particularly relates to a synthesized silica glass optical member suitable for a lens, a window member, a mirror, a prism, a filter, and the like, and a method for manufacturing it.

2. Description of the Related Art

Because synthesized silica glass contains a quite small amount of metal impurities that absorb light, and has high purity, the synthesized silica glass has high transparency over a wide wavelength range from a near-infrared region to a vacuum ultraviolet region to be transparent. In addition, the synthesized silica glass has a very small thermal expansion coefficient to be excellent in the stability of size. Accordingly, the synthesized silica glass has mainly been used as optical members of optical apparatus using the g-ray (436 nm) and the i-ray (365 nm) as their light sources conventionally.

Recently, as LSI's (Large Scale Integrated circuits) have highly been integrated, a fine drawing technique capable of drawing lines narrower in width is required for an optical lithography technique for drawing integrated circuit patterns on wafers. Accordingly, the wavelengths of exposure light sources have been being shortened. As a result, KrF excimer lasers (248 nm) and ArF excimer lasers (193 nm), both having wavelengths shorter than the conventional g-ray (436 nm) and the i-ray (365 nm), have come to be used as light sources of steppers for lithography. Moreover, the examination about $F_2$ excimer lasers (157 nm) having a shorter wavelength also has begun. On the other hand, photomask substrates for optical members to be used in the steppers are required to have characteristics such as optical transparency in the wavelength ranges to be used, stability and durability.

Conventional synthesized silica glass to be used in these optical systems produces new absorption bands in an ultraviolet region when it is irradiated by a high energy ray of, for example, a KrF excimer laser (248 nm) or an ArF excimer laser (193 nm) for a long time. The synthesized silica glass produces an absorption band of about 215 nm in wavelength, the so-called E' center, and an absorption band of about 260 nm in wavelength, the so-called NBOHC (Non-Bridging Oxygen Hole Center). These absorption bands produce such undesirable phenomena in these optical systems as the decrease of their transmittancy, the increase of their absolute refractive indices, the changes of their distributions of the refractive indices, the generation of fluorescence, and the like. Consequently, the conventional synthesized silica glass has the aforesaid problems for being used as an optical member of optical systems having a light source of an excimer laser.

The mechanism of the generation of these absorption bands has not fully investigated, however the mechanism can be considered that the new absorption bands are produced owing to paramagnetic defects that are produced in the synthesized silica glass owing to the optical reactions that are expressed by the following formulae (1) and (2) and generated by the irradiation of a laser beam on such peculiar defects of the synthesized silica glass as an oxygen lacking type defect expressed by a chemical formula ≡Si—Si≡ and an oxygen excessive type defect expressed by a chemical formula ≡Si—O—O—Si≡.

Accordingly, for the improvement of the transparency in the wavelength band of $F_2$ excimer lasers, there have been made attempts to obtain the durability to the irradiation of the ultraviolet rays by making silica glass obtained by the vapor-phase axial deposition (VAD) method contain fluorine, or by making silica glass obtained by the flame hydrolysis method called as the direct method contain hydroxyl groups or hydrogen molecules.

For example, Japanese Laid-Open Patent Publication HEI 10-67521 discloses a method for adding a fluorine gas to a porous silica glass by making a raw material gas contain the fluorine gas at the time of forming the porous silica glass body by generating the flame hydrolysis of the raw material with a burner. Japanese Laid-Open Patent Publication HEI 11-240728 discloses a method for making a porous silica glass body transparent glass by heating the porous silica glass body in an atmosphere including a hydrogen gas and a water vapor at 1400° C. or more. Moreover, Japanese Laid-Open Patent Publications HEI 8-67530 and HEI 8-75901 disclose a method of the heat treatment of a porous silica glass body in a hydrogen gas atmosphere after the vitrification of the porous silica glass body in an atmosphere of a $SiF_4$/He gas.

However, even in the thus manufactured high purified synthesized silica glass, absorption bands owing to structural defects called as the E' centers and the NBOHC's appear to decrease the transmittancy thereof in an ultraviolet region extremely when the synthesized silica glass is irradiated by an excimer laser beam for a long time.

SUMMARY OF THE INVENTION

Therefore, it is an object of the present invention to provide a synthesized silica glass optical member and method therefor which overcome the above issues in the related art. This object is achieved by combinations described in the independent claims. The dependent claims define further advantageous and exemplary combinations of the present invention.

Another object of the present invention is to improve the transmittancy of a synthesized silica glass, aforementioned, to which fluorine compound is added in the ultraviolet region and to suppress the generation of absorption and fluorescence emission by the irradiation of an excimer laser beam. Further object of the present invention is, therefore, to provide a synthesized silica glass optical member excellent in laser light durability characteristics as an optical glass member for transmitting ultraviolet rays, and to provide a method for manufacturing it.

According to a first aspect of the present invention, there is provided a method for manufacturing a synthesized silica glass optical member, said method comprising: providing a porous silica glass body; heating the porous silica glass body in an atmosphere containing hydrogen or oxygen, and sintering the porous silica glass body in an atmosphere containing fluorine compound.

According to a second aspect of the present invention, there is provided a synthesized silica glass optical member manufactured by the method above.

According to a third aspect of the present invention, there is provided a method for a lithography using a photo mask, in which the photo mask utilizes a glass optical member, said method comprising: providing a porous silica glass body for the glass optical member; heating the porous silica glass body in an atmosphere containing hydrogen or oxygen; and sintering the porous silica glass body in an atmosphere containing a fluorine compound.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

The above and other objects, features and advantages of the present invention will become more apparent from the following description of the presently preferred exemplary embodiments of the invention taken in conjunction with the accompanying drawings.

DETAILED DESCRIPTION OF EMBODIMENTS

The invention will now be described based on the embodiments, which do not intend to limit the scope of the present invention, but exemplify the invention. All of the features and the combinations thereof described in the embodiment are not necessarily essential to the invention.

The inventors of the present invention performed studies in detail about a sintering atmosphere at the time of the vitrification of a porous silica glass body. As a result, the inventors found the following fact and resolved the aforesaid problem. That is, when the porous silica glass body is heated at a high temperature at which the porous silica glass body does not shrink in an atmosphere containing hydrogen or oxygen at first, and then the porous silica glass body is sintered by being further heated to be transparent glass, the transmittancy of the porous silica glass body is improved by about 5% or more than that of the conventional one.

Figure 1:
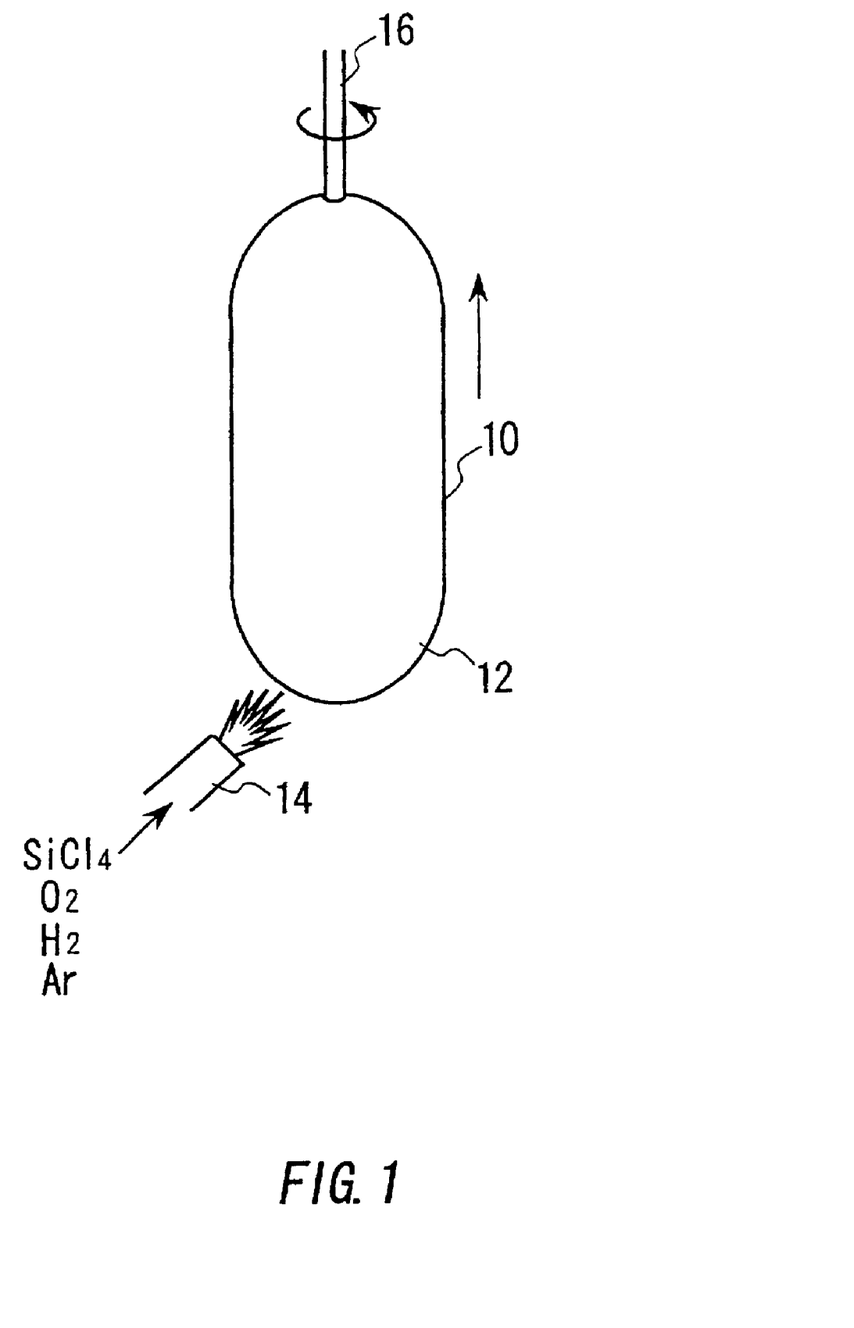
FIG. 1 shows an apparatus for a VAD method for manufacturing a porous silica glass body, according to an embodiment of the present invention.

In an embodiment of the present invention, a porous silica glass body for a synthesized silica glass optical member is obtained by a VAD method. The VAD method may be achieved by using, for instance, an apparatus as shown in FIG. 1. An initial material not shown is attached with a support shaft 16, which is rotatable around its axis and movable in the axial direction. A raw material, $SiCl_4$, oxygen and hydrogen with an argon gas as a carrier gas are supplied to a burner 14. Glass particle are formed by flame hydrolysis reactions caused in the flame by the burner. The glass particles thus formed are deposited on a growing portion 12 of a porous silica glass body 10 which is growing on the initial material while the silica glass body 10 is rotating around the axis of the support shaft 16 and being moved along with the support shaft 16 in the axial direction.

Figure 2:
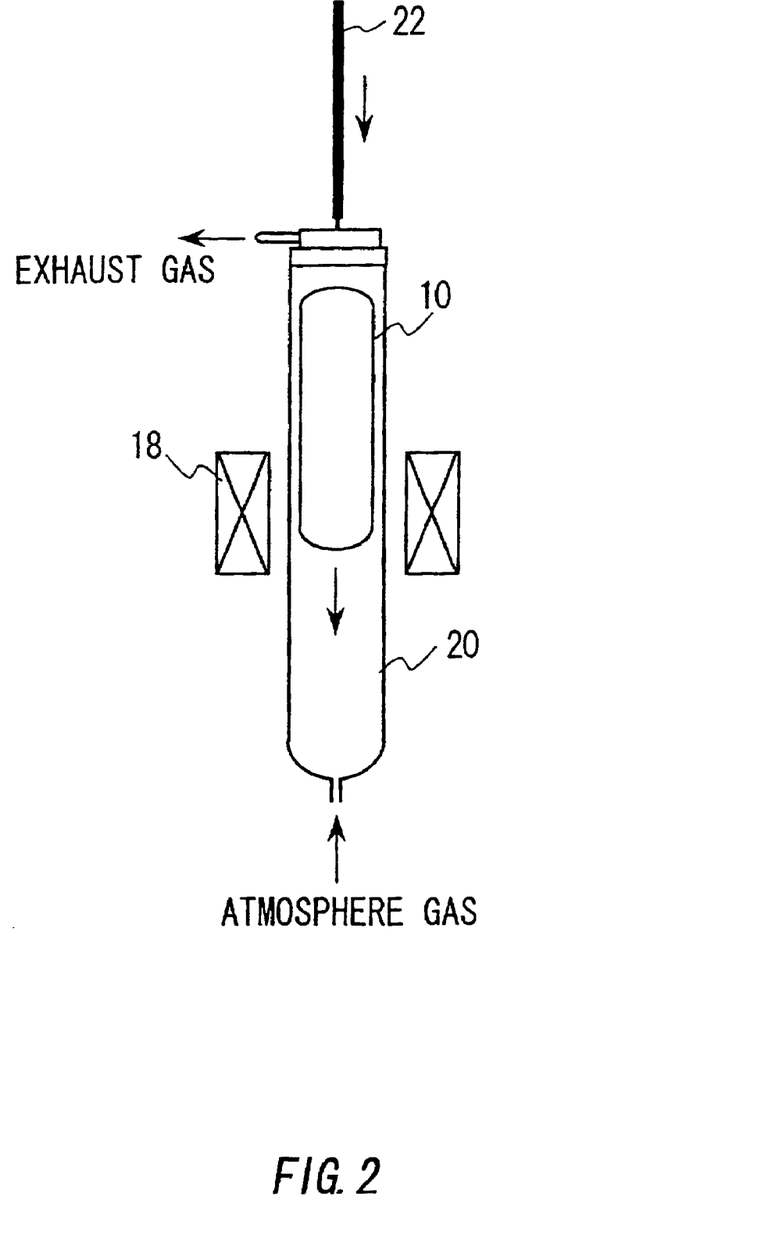
FIG. 2 shows an apparatus for a high temperature treatment and vitrification process for manufacturing an synthesized silica glass, according to the embodiment of the present invention.

The porous silica glass 10 thus obtained is subjected to heat treatments, using an apparatus as shown in FIG. 2. The porous silica glass body 10 which is supported by the support shaft 22 is heated with an atmosphere containing hydrogen or oxygen by a heater 18 in a container 20. Then, the porous silica glass body 10 is sintered with an atmosphere containing fluorine compound within the container 20 by the heater 18 it to be transparent glass. In this embodiment, these two processes are carried out with the same apparatus. However, it is not limited to the embodiment, and different equipments may be used for the respective processes.

The step of heating the porous silica glass body is preferably performed within a temperature range from 500° C. to a critical temperature below which the porous silica glass body does not shrink, especially below a temperature of 1250° C.

A synthesized silica glass optical member according to the embodiment of the present invention is manufactured by the method described above.

The optical member thus formed is applied to a photo mask of a lithography. For the lithography, a light source of an ultraviolet laser having a wavelength of 400 nm or less, especially $F_2$ excimer laser is used.

EXAMPLES

Example 1

Figure 3:
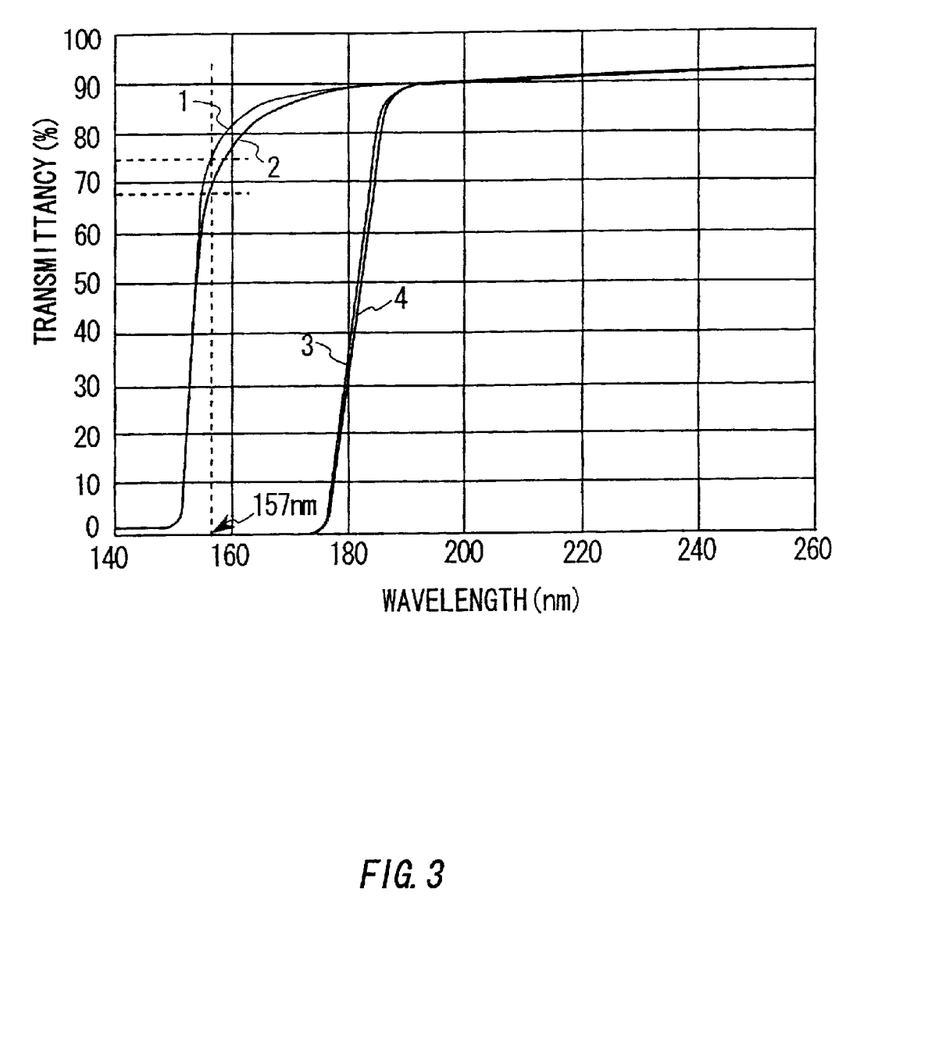
FIG. 3 is a graph showing the characteristics of the transmittancy of synthesized silica glass obtained in Example 1 according to an embodiment of the present invention and Comparative examples 1–3.
Figure 5:
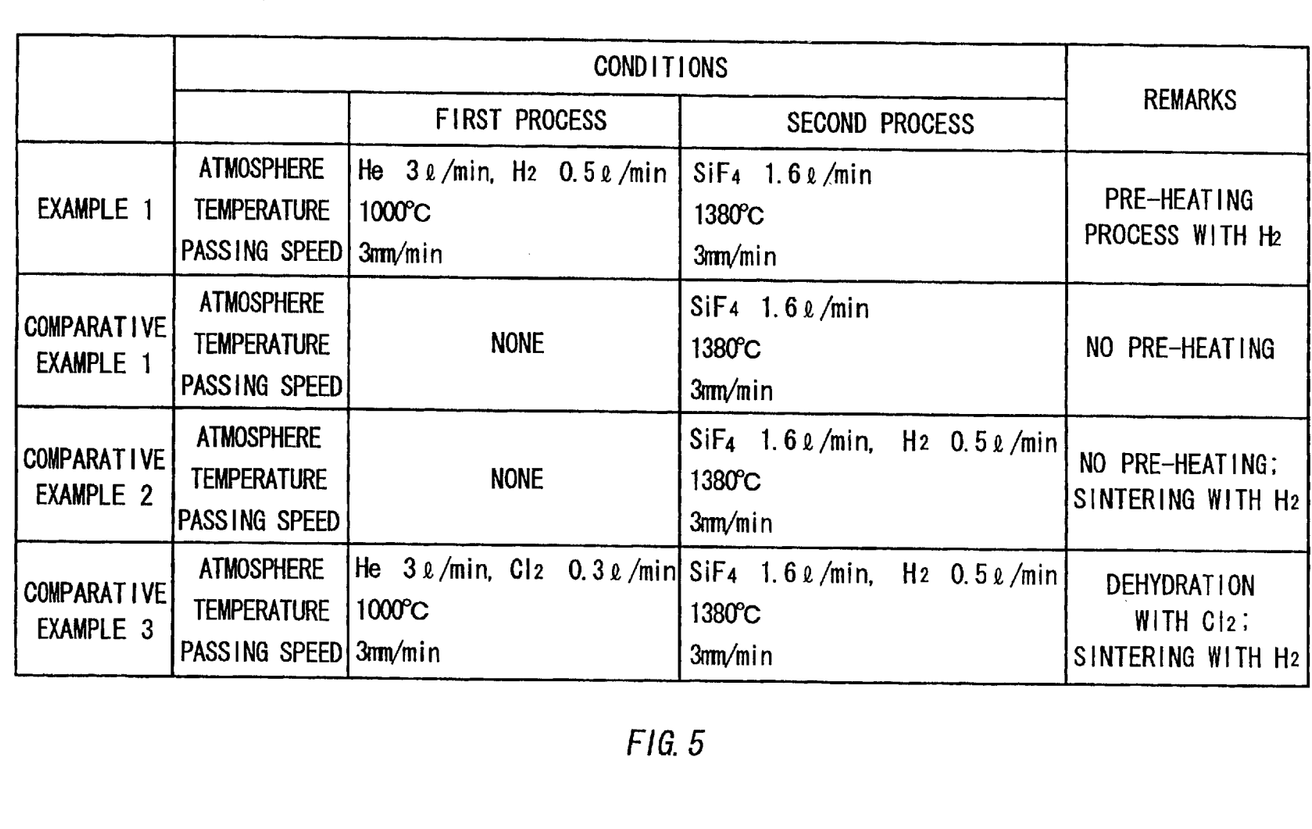
FIG. 5 is a table showing the conditions of the processing of Example 1 and Comparative examples 1–3.

A porous silica glass body was obtained by a VAD method, using an apparatus as shown in FIG. 1 in which the flame hydrolysis reactions of a raw material, $SiCl_4$, were caused in the flames of oxygen and hydrogen with an argon gas as a carrier gas. The density of the obtained porous silica glass body was 0.22 g/cm$^3$. The obtained porous silica glass body was processed by the first processing in which the porous silica glass body was passed through in a hydrogen and helium atmosphere at a temperature of 1,000° C. at a passing speed of 3 mm/min. in the high temperature section at first. Then, the porous silica glass body was processed by the second processing (sintering) in which the porous silica glass body was passed through in a $SiF_4$ atmosphere at a temperature of 1,380° C. at a passing speed of 3 mm/min. in the high temperature section. Thereby, a transparent glass body was obtained. The obtained transparent glass body was sliced and polished into the thickness of 10 mm, and the transmittancy thereof in an ultraviolet region was measured. The processing conditions are shown in FIG. 5, and the results of the measurements are shown in FIG. 3.

Comparative Examples 1–3

Porous silica glass bodies as comparative examples were made similarly to Example 1 of the embodiment of the present invention. The porous silica glass bodies of Comparative Examples 1–3 were sintered under the conditions shown in FIG. 5, and transparent glass bodies were obtained.

More specifically, the porous silica glass body for Comparative Example 1 was subjected to only one heating process such that the porous silica glass body was passed through in a $SiF_4$ atmosphere at a temperature of 1,380° C. at a passing speed of 3 mm/min without any pre-heating process.

The porous silica body for Comparative Example 2 was also subjected to only one heating process such that the porous silica glass body was passed through in an $SiF_4$ and $H_2$ atmosphere at a temperature of 1,380° C. at a passing speed of 3 mm/min without any pre-heating process.

The porous silica body for Comparative Example 3 was processed by the first processing in which the porous silica glass body was passed through in a helium and $Cl_2$ atmosphere at a temperature of 1,000° C. at a passing speed of 3 mm/min. in the high temperature section at first, for dehydration. Then, the porous silica glass body was processed by the second processing for sintering in which the porous silica glass body was passed through in a $SiF_4$ and $H_2$ atmosphere at a temperature of 1,380° C. at a passing speed of 3 mm/min. in the high temperature section.

The obtained transparent glass bodies were sliced and polished into the thickness of 10 mm, respectively, and the transmittancy of them was measured in an ultraviolet region. The results of the measurements are shown in FIG. 3.

As apparent from FIG. 3, it is recognized that the transmittancy of the curved line 1 indicating the results of Example 1 according to the embodiment of the invention in the ultraviolet region, especially at the wavelength of 157 nm of the $F_2$ excimer laser beam is 75.0% that is improved by 6.6% in comparison with the 68.4% of the curved line 2 (Comparative example 1). Incidentally, the transmittancy of the curved line 3 (Comparative example 2) and the curved line 4 (Comparative example 3) is zero at the wavelength of 157 nm, and the comparative examples 2 and 3 are not fitted as an optical member of an apparatus using the $F_2$ excimer laser as its light source.

By the performance of the first processing in a hydrogen atmosphere according to the embodiment of the invention, it can be recognized that the transmittancy in the ultraviolet region is remarkably improved.

Example 2

Figure 4:
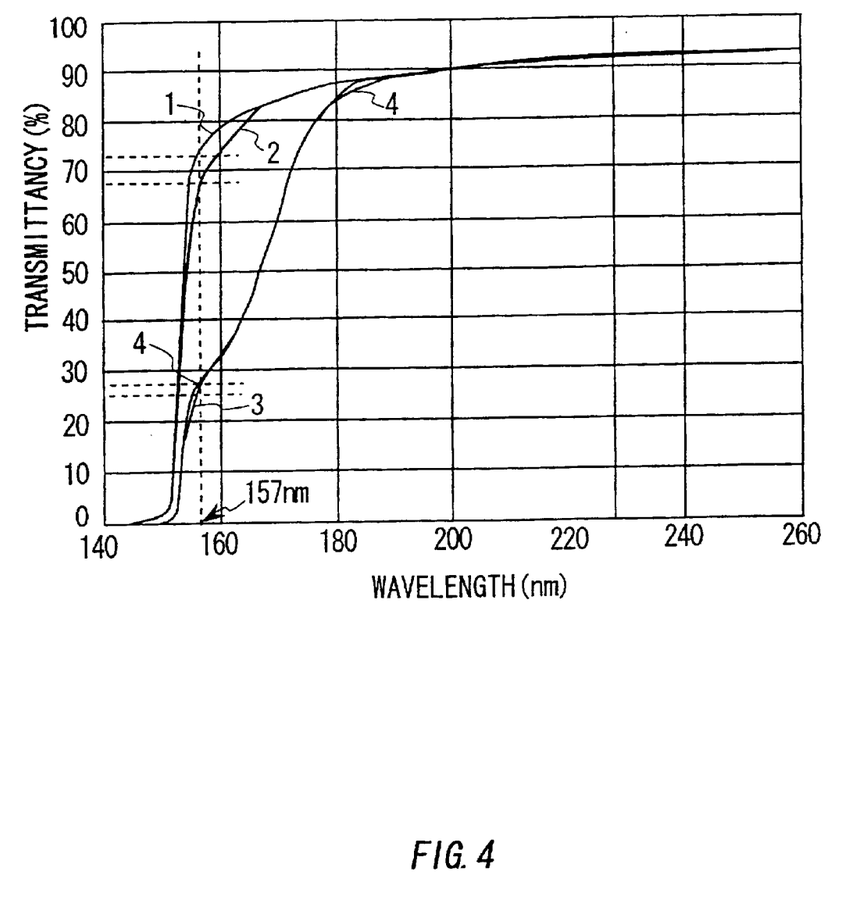
FIG. 4 is a graph showing the characteristics of the transmittancy of synthesized silica glass obtained in Example 2 according to the embodiment of the invention and Comparative examples 4–6.
Figure 6:
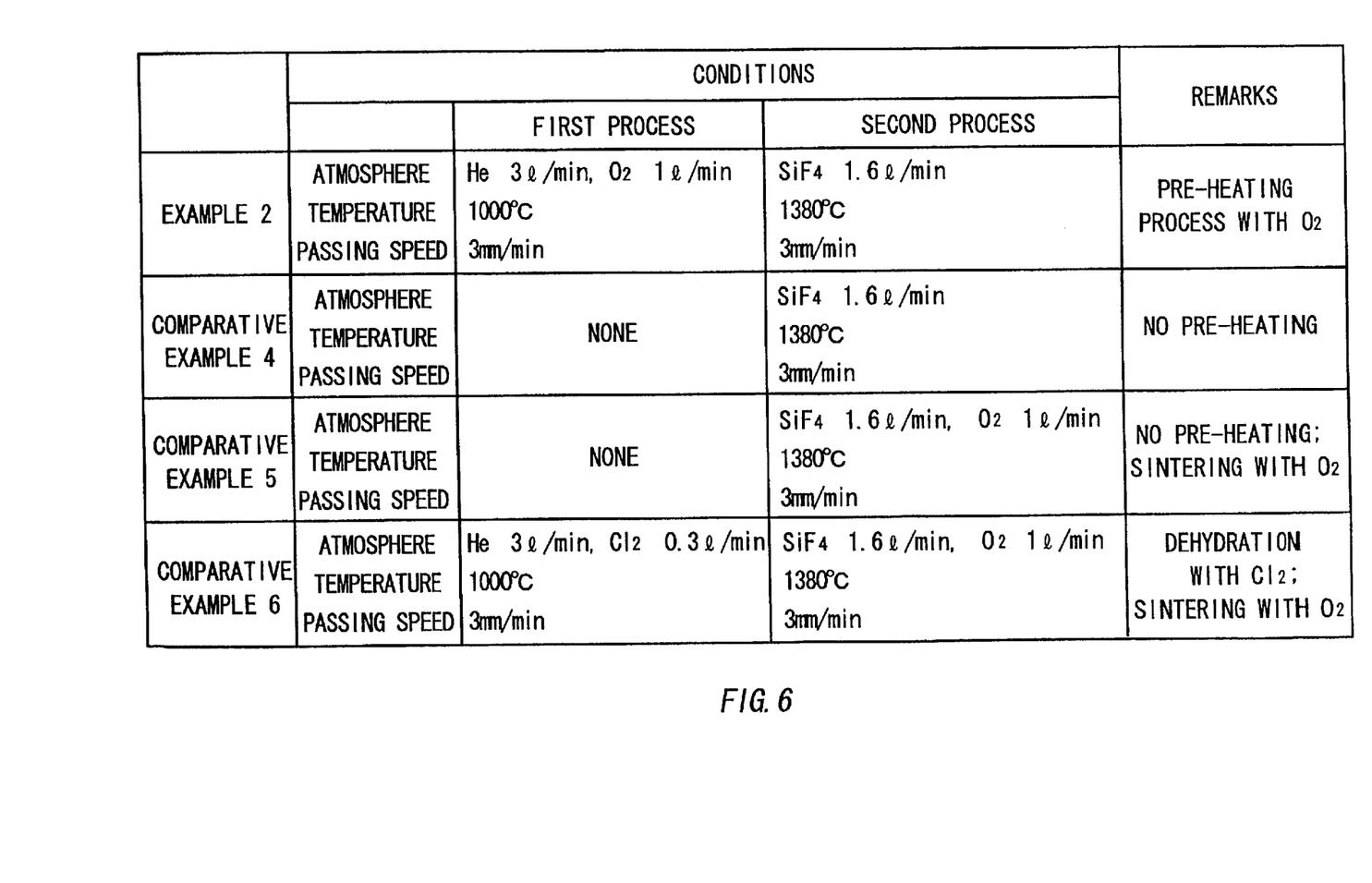
FIG. 6 is a table showing the conditions of the processing of Example 2 and Comparative examples 4–6.

A porous silica glass body was obtained by the VAD method, using the apparatus as shown in FIG. 1 in which the flame hydrolysis reactions of a raw material, $SiCl_4$, were caused in the flames of oxygen and hydrogen with an argon gas as a carrier gas. The density of the obtained porous silica glass body was 0.22 g/cm$^3$. The obtained porous silica glass body was processed by the first processing in which the porous silica glass body was passed through in a oxygen and helium atmosphere at a temperature of 1,000° C. at a passing speed of 3 mm/min. in the high temperature section. Then, the porous silica glass body was processed by the similar second processing for sintering in a $SiF_4$ atmosphere at a temperature of 1,380° C. Thereby, a transparent glass body was obtained. The obtained transparent glass body was sliced and polished into the thickness of 10 mm, and the transmittancy thereof in an ultraviolet region was measured. The processing conditions are shown in FIG. 6, and the results of the measurements are shown in FIG. 4.

Comparative Examples 4–6

Porous silica glass bodies were made similarly to Example according to the embodiment of the present invention. The porous silica glass bodies were sintered under the conditions shown in FIG. 6, and transparent glass bodies were obtained.

More specifically, the porous silica glass body for Comparative Example 4 was subjected to only one heating process such that the porous silica glass body was passed through in a $SiF_4$ atmosphere at a temperature of 1,380° C. at a passing speed of 3 mm/min without any pre-heating process.

The porous silica body for Comparative Example 5 was also subjected to only one heating process such that the porous silica glass body was passed through in an $SiF_4$ and $O_2$ atmosphere at a temperature of 1,380° C. at a passing speed of 3 mm/min without any pre-heating process.

The porous silica body for Comparative Example 6 was processed by the first processing in which the porous silica glass body was passed through in a helium and $Cl_2$ atmosphere at a temperature of 1,000° C. at a passing speed of 3 mm/min. in the high temperature section at first, for dehydration. Then, the porous silica glass body was processed by the second processing for sintering in which the porous silica glass body was passed through in a $SiF_4$ and $O_2$ atmosphere at a temperature of 1,380° C. at a passing speed of 3 mm/min. in the high temperature section.

The obtained transparent glass bodies were sliced and polished into the thickness of 10 mm, respectively, and the transmittancy of them was measured in an ultraviolet region. The results of the measurements are shown in FIG. 4.

As apparent from FIG. 4, it is recognized that the transmittancy of the curved line 1 indicating the results of Example 2 according to the embodiment of the present invention in the ultraviolet region, especially at the wavelength of 157 nm of the $F_2$ excimer laser beam is 72.2% that is improved by 5.2% in comparison with the 67.0% of the curved line 2 (Comparative example 4). Moreover, it is also recognized that the transmittancy of the curved line 1 is far higher than the transmittancy, 24.7%, of the curved line 3 (Comparative example 5) and that, 26.6%, of the curved line 4 (Comparative example 6).

By the performance of the first processing in an oxygen atmosphere, it is recognized that the transmittancy in the ultraviolet region is remarkably improved.

The synthesized silica glass optical member obtained by the method according to the embodiment of the present invention can suppress the generation of absorption and fluorescence emissions when it is irradiated by an excimer laser beam, and has high transmittancy in an ultraviolet region, especially at the wavelength of 157 nm of a $F_2$ excimer laser beam. Consequently, the synthesized silica glass optical member is excellent in a laser beam resistance characteristic.

Although the present invention has been described by way of exemplary embodiments, it should be understood that many changes and substitutions may be made by those skilled in the art without departing from the spirit and the scope of the present invention which is defined only by the appended claims.

What is claimed is:

1. A method for manufacturing a synthesized silica glass optical member, said member comprising:
   providing a porous silica glass body;
   heating the porous silica glass body in an atmosphere containing hydrogen, wherein a temperature in within a range from 500° C. to 1000° C.; and
   sintering the porous silica glass body in an atmosphere containing a fluorine compound.

2. The method according to claim 1, wherein said heating precedes said sintering.

3. The method according to claim 1, wherein said providing the glass body includes forming glass particles by flame hydrolysis of a raw material.

4. A method for manufacturing a synthesized silica glass optical member, said member comprising:
   providing a porous silica glass body;
   heating the porous silica glass body in an atmosphere containing oxygen; and
   after the heating step, sintering the porous silica glass body in an atmosphere containing a fluorine compound.

5. The method according to claim 4, wherein a temperature of said heating is within a range from 500° C. to critical temperature below which the porous silica glass body does not shrink.

6. The method according to claim 5, wherein a temperature of said heating is 1250° C. or below.

7. The method according to claim 4, wherein said providing the glass body includes forming glass particles by flame hydrolysis of a raw material.

8. The method according to any one of claims 1–7, wherein the fluorine compound comprises $SiF_4$.

* * * * *